UNITED STATES PATENT OFFICE.

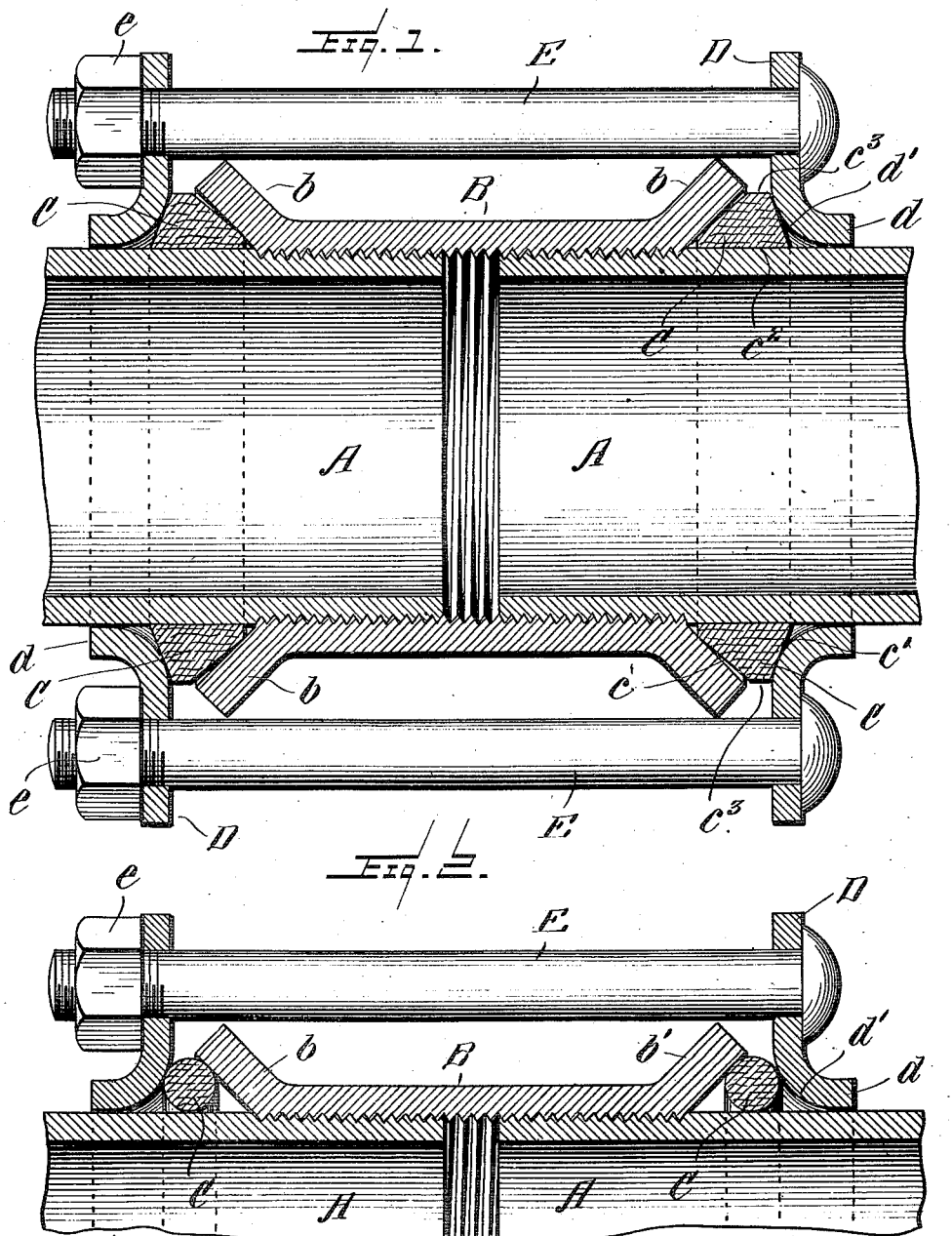

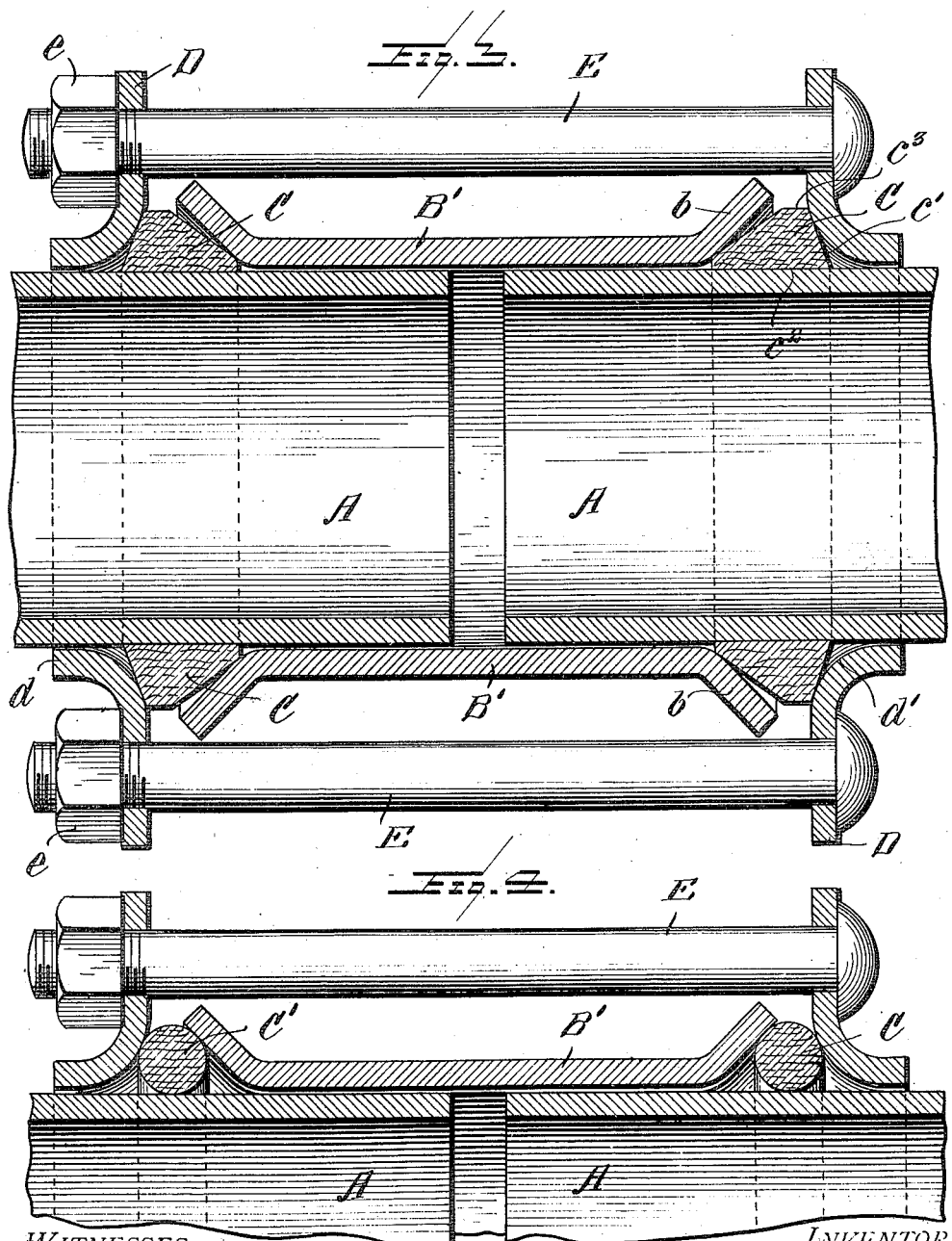

JAMES CLARK, OF BRADFORD, PENNSYLVANIA, ASSIGNOR TO S. R. DRESSER MANUFACTURING COMPANY, OF BRADFORD, PENNSYLVANIA.

PIPE-COUPLING.

964,609.

Specification of Letters Patent.

Patented July 19, 1910.

Application filed January 2, 1907. Serial No. 350,530.

*To all whom it may concern:*

Be it known that I, JAMES CLARK, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention consists in the novel features hereinafter described, reference being had to the accompanying drawings which illustrate several forms in which I have contemplated embodying it and said invention is fully disclosed in the following description and claims.

Referring to the drawings, Figure 1 represents a longitudinal sectional view of a coupling for threaded or screw pipe sections embodying my invention. Fig. 2 is a partial sectional view of a similar coupling illustrating a modified form of packing ring. Fig. 3 is a longitudinal sectional view of a coupling for plain end pipe sections embodying my invention. Fig. 4 is a partial sectional view of the same showing a modified form of the packing ring.

The object of my invention is to provide a coupling of very simple form for connecting screw threaded or plain end pipe sections and insuring a perfectly tight joint.

In the form shown in Fig. 1, the coupling is constructed for use with screw threaded pipe sections which are indicated at A A. B represents the middle ring or sleeve of my improved coupling which consists of a cylindrical main body, internally threaded to receive the threaded portions of the pipe sections and having its end portions $b$ $b$ bent outwardly at an angle to the axis of the ring to form annular packing recesses, angular in cross section as shown. C, C represent packing rings surrounding smooth portions of the pipe sections beyond the threaded portions, and located within the packing recesses in the middle ring B. Each of these packing rings is provided with an inclined or beveled face, $c$ to engage the annular portion $b$ of the middle ring, and with an inclined rear or outer face $c'$ as clearly shown in Fig. 1, the inner face $c^2$ and the outer face $c^3$ of the ring being annular and parallel, although the shape of the outer peripheral portions $c^3$ is not material. I prefer to form these packing rings of wood (preferably a wood soft enough to be compressible to a considerable degree) with the grain running in a direction parallel to the axis of the ring as shown in Fig. 1, but they may be made of wood pulp molded into the desired form. I may also employ rubber or other compressible material for this purpose, if desired, but as before stated I prefer to use wood with the grain disposed parallel to the axis of the packing ring. D, D represent the clamping rings for crowding the packing rings into the packing recesses and compressing them so as to make a tight joint between the pipe and the middle ring independently of the screw connection. The clamping rings D are made preferably of wrought metal such as wrought iron or steel, although they may be made of cast iron or other suitable material, and each of said rings consists of a flat plate portion of any desired shape or form as round, polygonal, or oval, provided with bolt holes and having a central annular flange extending on the outer face of the plate as indicated at $d$ and forming within the same a central pipe aperture through which one of the pipe sections $a$ extends. When the clamping ring is in operative position as shown in Fig. 1, the flange $d$ extends away from the middle ring and closely surrounds one of the pipe sections, and the portion $d'$ of the ring D, at the base of the flange $d$ is curved, as shown, or inclined, to engage the outer face $c'$ of the packing ring C, so that the said curved or inclined portion $d'$ will tend to force the packing ring against the pipe section. E represents the bolts which connect the clamping rings and are provided with nuts $e$.

In assembling the parts of the coupling upon the meeting ends of two threaded pipe sections, the said pipe sections are first screwed into the middle ring B, the packing rings C C are pushed into the packing recesses of the middle ring, and the clamping rings D D are moved up into engagement with the packing rings and the bolts are passed through them and the nuts are turned up so as to draw the rings D D toward each other and compress the packing rings upon the pipe sections and between the pipe sections and the end portions $b$ $b$ of the middle ring, as clearly shown in Fig. 1.

Fig. 2 shows a portion of a coupling constructed exactly like that shown in Fig. 1 except that instead of the packing rings C, rings C' circular in cross section are employed, the operation being the same as that described with reference to the form shown in Fig. 1. The rings C' being round in cross section the portions engaged by the middle ring and by the clamping ring are curved or sloping faces and the effect produced is similar to that previously described in compressing the ring C' upon the pipe section.

In Fig. 3 I have shown a sectional view of a pipe coupling for plain end pipe sections embodying my invention. In this figure A' A' represent the meeting ends of plain end pipe sections, B' is the middle ring or sleeve which consists of a plain unthreaded cylindrical body having its end portions bent outwardly at an angle to the axis of the ring to form angular packing recesses. The middle ring C' is made preferably of wrought iron or steel although it may be made of cast iron if desired. This coupling is provided with a pair of clamping rings D D and packing rings C C, and with bolts E E all exactly as shown and described in reference to Fig. 1.

Fig. 4 represents a partial view of a coupling substantially identical with the coupling shown in Fig. 3, except that it is provided with packing rings C' C', circular in cross section, such as are shown in Fig. 2, the other parts being identical with those shown in Fig. 3.

It is to be understood that all of the forms of packing rings C, C' and C² herein shown and described are preferably formed of wood with the grain running substantially parallel to the axis of the ring, but they may be made of wood pulp, or rubber, or other suitable material.

What I claim and desire to secure by Letters Patent is:—

1. A coupling for uniting adjacent pipe sections comprising a tubular middle ring having a considerable portion adjacent to each end bent bodily outward to form wide packing recesses around the pipes, a packing ring for each of said packing recesses, having inclined portions to engage the interior faces of said packing recesses, and oppositely inclined exterior portions, clamping rings having plate portions disposed perpendicularly to the axes of the pipes and provided with bolt holes, and having outwardly curving portions adjacent to their inner edges to engage the exterior inclined portions of the packing rings, and bolts and nuts connecting said clamping rings.

2. A coupling for uniting adjacent pipe sections of threaded pipe, comprising a tubular middle ring having a considerable portion at each end of the same bent bodily outward to form wide packing recesses around the pipes, said middle ring being internally screw threaded between the said packing recesses, a packing ring for each of said packing recesses, having inclined portions to engage the interior faces of said packing recesses, and oppositely inclined exterior portions, clamping rings having plate portions disposed perpendicularly to the axes of the pipes and provided with bolt holes, and having outwardly curving portions adjacent to their inner edges to engage the exterior inclined portions of the packing rings, and bolts and nuts connecting said clamping rings.

In testimony whereof I affix my signature, in the presence of two witnesses.

JAMES CLARK.

Witnesses:
F. P. SCHOONMAKER,
F. P. RYAN.